3,645,995
POLYMERIZATION PROCESS
Anthony David Caunt, Welwyn Garden City, England, assignor to Imperial Chemical Industries, Limited, London, England
No Drawing. Filed Jan. 16, 1969, Ser. No. 791,783
Claims priority, application Great Britain, Jan. 29, 1968, 4,497/68
Int. Cl. C08f 1/56, 3/02
U.S. Cl. 260—88.2               5 Claims

ABSTRACT OF THE DISCLOSURE

Olefines of 5 or more carbon atoms are polymerized using a catalyst of titanium trichloride/organometallic activator. The titanium trichloride component of the catalyst is prepared by the reduction of titanium tetrachloride with a high aluminum alkyl compound, particularly isobutyl aluminum sequichloride.

---

The present invention relates to the polymerization of olefines and in particular to the polymerization of branched olefine monomers.

Olefines may be polymerized to polymers of high molecular weight and crystallinity using polymerization catalysts of the Ziegler type. These catalysts typically comprise, in combination, a transition metal compound, and organo-metallic compound. As the transition metal compound, titanium compounds are widely used, particularly the halides, and to obtain highly crystalline polymers, titanium trichloride catalysts have proved to be very suitable. The term titanium trichloride includes not only pure titanium trichloride, but also the products of reduction of titanium tetrachloride with aluminum metal (as described in British Pat. 877,050) or with organo-aluminum compounds, which materials also contain complexed aluminum compounds. Commonly used organo-metallic compounds are the organo-aluminum compounds such as aluminum trialkyls, dialkyl aluminum monohalides, or, in combination with a third component, monoalkyl aluminum dihalides.

Using such catalysts, branched chain olefines such as 3-methyl butene-1, 3-methyl pentene-1,3-ethyl pentene-1, 4-methyl pentene-1, 4,4'-dimethyl pentene-1, etc., can be polymerized to polymers of high melting points, for example, in excess of 200° C., or even, in certain cases, above 300° C. Furthermore, polymers of 4-methyl pentene-1, when sufficiently deashed, may be moulded into articles having a high light transmission, as is also possible with polymers of 4-methyl hexene-1, 5,5'-dimethyl hexene-1 and 5-methyl hexene-1.

According to the present invention, branched chain olefine monomers are polymerized in the presence of a polymerization catalyst comprising an organo metallic compound and the insoluble reaction product of titanium tetrachloride with an organo-aluminum compound of formula $R_2AlX$ or mixtures thereof with compounds of the formula $RAlX_2$, wherein R is an alkyl group containing 3 to 6 carbon atoms and X is chloride or bromide.

To obtain a satisfactory catalyst, the insoluble reaction product is prepared at a temperature in the range $-20°$ C. to $+20°$ C., the preferred temperature being about 0° C.

The insoluble reaction product may be obtained by adding titanium tetrachloride to the organo-aluminum compound, or by adding the titanium tetrachloride and the organo-aluminum compound simultaneously to a suitable reaction vessel. However, to obtain a catalyst of particularly high activity, the organo-aluminum compound, dissolved in an inert hydrocarbon diluent, is added gradually, over a period of several hours, typically 2 to 10 hours, to a stirred solution of titanium tetrachloride in the same diluent, maintained at a temperature of about 0° C.

After the reaction between the organo-aluminum compound and titanium tetrachloride is complete, the reaction mixture may be heated to a temperature in the range 60° C. to 150° C., preferably in the range 80° C. to 120° C., before separating the insoluble reaction product from the hydrocarbon diluent. The separated reaction product can then be washed with further hydrocarbon if desired.

The reaction product obtained by this procedure is a solid solution of titanium trichloride and aluminum chloride, together with some complexed organo-aluminum compounds such as aluminum alkyl dihalides, and also, if the reaction product has not been sufficiently washed, a proportion of aluminum dialkyl monohalide and a further quantity of uncomplexed aluminum alkyl dihalide, which may be removed by washing.

The organo-aluminum compound used to react with the titanium tetrachloride may be represented by the general formula $R_nAlX_{(3-n)}$, where $n$ is greater than one and not more than two. Values of $n$ of less than two represent mixtures of aluminum dialkyl halides and aluminum alkyl dihalides. In such mixtures, rapid exchange reactions between halogen and alkyl groups occur and thus these mixtures consist of a mixture of alkyl aluminum halide species in equilibrium. Since the dihalide is a polymerization inhibitor, any excess uncomplexed dihalide remaining after the production of the insoluble reaction product should preferably be removed by washing, and since this is wasteful in respect of the aluminum compound, it is preferred not to use, in the reaction with titanium tetrachloride, a mixture of alkyl aluminum halides containing excessive quantities of the dihalide. Thus, it is preferred that in the mixtures the value of $n$ should be at least 1.2. Mixtures of halide and dihalide in approximately equimolar amounts are commonly termed "sesquihalides," and hereafter the term "sesquihalide" is used in respect of those mixtures in which the value of $n$ is in the range 1.4 to 1.6.

The reaction product may be obtained by reacting the titanium tetrachloride and the organo-aluminum compound together in known molar proportions, such as in the range 1 to 10 up to 1 to 0.1. Within this range we have found proportions in the range 1 to 2 up to 1 to 0.5 to give particularly satisfactory results, especially ratios in the range 1 to 1 up to 1 to 0.5, for example, 1 to 0.9. The foregoing molar proportions are expressed as the ratio of gramme moles of titanium tetrachloride to (n-1) gramme atoms of aluminum present as the compound $R_nAlX_{(3-n)}$.

The alkyl group R may be, for example, n-propyl, n-butyl, isobutyl, isohexyl or n-hexyl. If desired, the insoluble reaction product may be prepared by first treating the titanium tetrachloride with the compound $R_nAlX_{(3-n)}$, and then completing the reaction by adding an ethyl aluminum halide, for example, aluminum ethyl sesquichloride, to the reaction mixture. The preferred organo-aluminum compound is aluminum sesqui-isobutyl chloride.

The organo-metallic activator and the insoluble reaction product may be used in any of the known proportions such as 1 to 10 to 10 to 1 and particularly 1 to 1 to 5 to 1, a convenient amount being a 2:1 molar ratio. The organo-metallic activator is preferably an organo-aluminum activator, most preferably a dialkyl aluminum chloride.

Typical branched chain olefine monomers (which term is used to include cycloalkyl olefine monomers) for use in accordance with the present invention have the general formula:

in which m is 0, 1 or 2, $R_1$ is a methyl or ethyl group, $R_2$ is an alkyl group of 1 to 5 carbon atoms or $R_1$ and $R_2$ between them form a cycloalkyl group and $R_3$ is hydrogen if $m$ is 0, or $R_3$ is hydrogen or a methyl or an ethyl group if $m$ is 1 or 2.

Monomers within this general formula include 3-methyl butene-1; 3-methyl pentene-1; 3-ethyl pentene-1; 3-methyl hexene-1; 4-methyl pentene-1; 4,4′-dimethyl pentene-1; 4-methyl hexene-1; 5-methyl hexene-1; 5,5′-dimethyl hexene-1; 3,5′-dimethyl hexene-1; 3,5,5′-trimethyl hexene-1, and vinyl cyclohexane.

The branched chain monomers may be polymerized alone, together, or with other olefine monomers, such as linear 1-olefines containing 4 to 18 carbon atoms.

The present invention is particularly suitable for the production of 4-methyl pentene-1 polymers as described in British Pat. 942,297; 968,935; 1,001,801; 1,014,886 and 1,085,914. Polymers of 4-methyl hexene-1; 5-methyl hexene-1 and 5,5′-dimethyl hexene-1, such as those described in British Pats. 968,471; 967,837; 975,994; 1,004,793; 1,018,970 and 1,089,774 may also be prepared in accordance with the present invention. If the branched monomers are being copolymerized, a technique of sequential polymerization, such as that described in British Pat. 1,085,914 may be used. Of the branched chain monomers, we prefer to use those which give highly crystalline polymers with only a small percentage of soluble polymer, such as those monomers in which $m=0$ or 1, and the longest linear carbon chain does not exceed 6 carbon atoms in length.

Polymerization is effected under conventional conditions of temperature and pressure, typically temperatures from 0° C. to 100° C., preferably 40° C. to 80° C. and pressures up to 10 atmospheres.

Using the present invention we have found that a branched chain monomer such as 4-methyl pentane-1 can be polymerized in high yield using a small proportion of catalyst. Thus, using a catalyst concentration (measured in terms of the titanium trichloride content of the insoluble reaction product) of 5 millimoles per litre of diluent, 4-methyl pentene-1 was polymerized to yield in excess of 70% using a sesqui-isobutyl reaction product, whilst with a sesqui-ethyl reaction product the yield obtained was less than 55%. This increased activity of the sesqui-isobutyl reaction product permits a lower catalyst concentration to be used, compared to that used with a catalyst based on a sequi-ethyl reaction product. The increased activity is not as great if the sesquiisobutyl compound is used only for the partial reduction of the titanium tetrachloride, the reaction being completed by the addition of aluminum ethyl sesquichloride. This increased activity is surprising since if propylene is polymerized under equivalent conditions with catalysts based on sesqui-isobutyl reaction products and sesqui-ethyl reaction products, we have found that the sesquiisobutyl reaction product is of slightly lower activity than the sesqui-ethyl reaction product, whereas the reverse is true with branched chain olefine monomers such as 4-methyl pentene-1.

Since the present invention makes it possible to use lower catalyst concentrations, the polymer product obtained has a lower residual ash content before subjecting to a deashing treatment. This is of particular importance in those polymers in which a low final ash content is required, for example, in obtaining 4-methyl pentene-1 polymers suitable for forming transparent mouldings, since the amount of ash to be removed from the polymer is reduced compared to the amount to be removed when using a sesqui-ethyl reaction product. The lower residual ash content of the polymer thus allows either fewer washing stages in ash emoval or the use of less expensive reagents for washing, for example, washing with water rather than anhydrous alcohol.

The insoluble reaction product may be prepared and the polymerization carried out in any suitable inert diluent. However, since cyclic hydrocarbons may swell the polymer we preferred to use an inert aliphatic hydrocarbon both for preparation of the insoluble reaction product and polymerization. The polymerization may, however, be carried out in the absence of diluent either in liquid or gaseous monomer.

The catalyst preparation and the polymerization process should be carried out in the substantial absence of oxygen or moisture. The polymerization may be effected either completely or partially in the presence of a molecular weight modifying agent, such as hydrogen.

The following examples illustrate, but do not limit, the present invention.

EXAMPLE 1

Preparation of aluminum sesqui-isobutyl chloride

To 2,990 mls. of an inert, saturated aliphatic hydrocarbon (boiling point in the range 168 to 187° C.) in a 5 litre flask under nitrogen were added 1,110 grammes of tri-isobutyl aluminum.

1,574 mls. of the solution thus obtained (containing 2 moles of tri-isobutyl aluminum) were added to 284.3 grammes (2.13 moles) of aluminum chloride in a vacuum purged, nitrogen filled 5 litre flask. This mixture was heated to 70° C. and maintained at this temperature with stirring, for 24 hours. The supernatant liquid was decanted from a small amount of precipitate.

The liquid was analysed and found to contain 2.38 gramme atoms of aluminum and 3.59 gramme atoms of chloride per litre and thus the solution contained the equivalent of 1.17 moles aluminum di-isobutyl chloride and 1.21 moles aluminum isobutyl dichloride. This mixture will hereinafter be termed "sesqui-isobutyl" (A). In this mixture the value of $n$ was 1.49.

EXAMPLES 2–4

Preparation of sesqui-isobutyl reduced titanium tetrachloride 44 mls. of titanium tetrachloride, 0.40 mole) and 80 mls. of hydrocarbon diluent were placed in a vacuum purged, nitrogen filled flask and the mixture was stirred at 0° C.

To this mixture was added a quantity of sesqui-isobutyl over a period of 6 hours and the mixture was stirred overnight at 0° C. The mixture was heated to 100° C. and maintained at that temperature for 4 hours, cooled, and washed with nitrogen sparged diluent until the supernatant liquid was free from chlorine as detected by shaking with aqueous silver nitrate solution. The insoluble reaction product was then dispersed to give a 0.5 molar suspension in hydrocarbon diluent.

EXAMPLE 5

A sample of sesqui-isobutyl (sesqui-isobutyl (B)) was prepared as in Example 1 but using only 267 grammes of aluminum chloride.

Titanium tetrachloride was reduced partly by sesqui-isobutyl (B) and partly by a sesqui-ethyl solution. The procedure of Examples 2–4 was repeated except that sesqui-isobutyl (B) was added for the first three hours and the sesqui-ethyl for the next three hours.

Comparative Examples A–C

The procedure as set out in Examples 2–4 was repeated using sesqui-ethyl solution in place of the sesqui-isobutyl.

The details of the catalyst preparations of Examples 2–5 and A–C are set out in Table 1.

TABLE 1

| Example | Aluminum compound | Amount (mls.) | Equivalent $R_2AlCl$ (moles) | $RAlCl_2$ (moles) |
|---|---|---|---|---|
| 2 | Sesqui-isobutyl (A) | 205 | 0.24 | 0.25 |
| 3 | do | 321 | 0.376 | 0.388 |
| 4 | do | 513 | 0.60 | 0.62 |
| 5 | {Sesqui-isobutyl (B) | 76 | 0.094 | 0.072 |
|   | {Sesqui-ethyl | 220 | 0.18 | 0.17 |
| A | Sesqui-ethyl | 293 | 0.24 | 0.25 |
| B | do | 440 | 0.36 | 0.37 |
| C | do | 733 | 0.60 | 0.58 |

EXAMPLES 6–10

Polymerization of 4-methyl pentene-1

Catalysts 2–5 were used for the polymerization of 4-methyl pentene-1, the procedure being as follows.

Into a vacuum purged, nitrogen filled reaction vessel maintained at a temperature of 60° C., were placed 500 mls. of hydrocarbon diluent, 120 mls. of 4-methyl pentene-1 monomer, 5 millimoles activator and 2.5 millimoles of catalyst. After one hour a further 60 mls. of 4-methyl penetene-1 were added and after a further hour, 10 mls. of isopropyl alcohol were added to terminate the polymerization. A sample of the supernatant liquid was removed and 1 ml. of this liquid was evaporated on a weighed glass paper in vacuo at 100° C. to determine the amount of soluble polymer produced. The solid polymer produced was washed by decantation with petrol ether and acetone.

The results obtained are set out in Table 2, the results obtained with catalysts A, B and C being given by way of comparison in comparative Examples D–G.

TABLE 2

| Example or Comparative Example | Catalyst | Activator | Polymer Percent yield | Percent soluble |
|---|---|---|---|---|
| 6 | 2 | Et$_2$AlCl | 63 | 1.85 |
| D | A | Et$_2$AlCl | 45 | 1.0 |
| 7 | 3 | Et$_2$AlCl | 85 | 1.1 |
| E | B | Et$_2$AlCl | 51 | 1.3 |
| 8 | 3 | iBu$_2$AlCl | 73.5 | 0.8 |
| F | B | iBu$_2$AlCl | 52.5 | 1.1 |
| 9 | 4 | Et$_2$AlCl | 82 | 1.45 |
| G | C | Et$_2$AlCl | 70 | 2.5 |
| 10 | 5 | Et$_2$AlCl | 60.5 | 2.1 |

It can be seen from Table 2 that the activity of the sesqui-isobutyl catalyst is greater than that of a closely corresponding sesqui-ethyl catalyst (compare Examples 6 and D; 7, 8 and E, F; and 9 and G). It will be observed also that catalyst 5, in which a partial sesqui-isobutyl reduction was used, is more active than corresponding sesqui-ethyl reduced catalyst (A and B; comparative Examples D and E). Sesqui-ethyl reduced catalyst C is more active than catalysts 2 and 5, but in the preparation of this catalyst a molar excess or organo-aluminum compound was used. Sesqui-isobutyl catalysts in which the molar proportion of organo-aluminum compound is approximately equal to (catalyst 3) or greater (catalyst 4) than the amount of titanium tetrachloride have a greater activity than sesqui-ethyl catalysts C. Furthermore, the increased activity achieved with catalysts 2 to 5 is not associated with a loss in the stereoregulating action of the catalyst, the percentage of soluble polymer obtained being essentially the same with the sesqui-isobutyl catalyst and the sesqui-ethyl catalyst.

EXAMPLES 11–13

A stirred two litre pressure vessel was vacuum purged and an atmosphere of nitrogen introduced. To the vessel, which was maintained at 60° C., was added one litre of hydrocarbon diluent, 120 ml., of 4-methyl pentene-1 containing 2% by volume of decene-1, an aluminum diethyl chloride activator and catalyst (the molar ratio of activator to catalyst was 2:1 in all cases). Hydrogen was then introduced to give a total pressure of 25 cms. above atmospheric, 500 mls. of a 2% solution of decene-1 in 4-methyl pentene-1 were fed into the vessel over a period of 1½ hours. Polymerisation was continued for a further 4½ hours and isopropyl alcohol was added to terminate polymerisation. The percentage of soluble polymer was determined and also the titanium content of the solid polymer before deashing.

The solid polymer was deashed by washing with isopropyl alcohol.

The results obtained are set out in Table 3. The melt flow index (M.F.I.) was measured by A.S.T.M. Method 1238–57T using a 5 kgm. weight and a temperature of 260° C. Comparative Examples H, 5 and J show the results obtained using catalysts B and C.

TABLE 3

| Example or Comparative Example | Catalyst | Concentration (mM./l.) | Polymer Percent yield | Percent soluble | Ti* (p.p.m.) | M.F.I. |
|---|---|---|---|---|---|---|
| 11 | 3 | 3 | 98 | 6.9 | 360 | 29 |
| 12 | 3 | 2 | 85 | 5.5 | 335 | |
| 13 | 3 | 1.5 | 72 | | 250 | 2.2 |
| H | B | 7.5 | 97 | 7.7 | 920 | 9 |
| I | B | 5 | 86 | 4 | 690 | 12 |
| J | C | 5 | 90.5 | 5 | 650 | 14 |

*Before deashing.

It will be observed that the extra activity of the sesqui-isobutyl catalysts may be used to decrease the quantity of catalyst used, compared to the sesqui-ethyl catalysts, and yet obtain the same yield of polymer which has a lower residual ash content before deashing.

When polymerization was effected in the absence of hydrogen, an M.F.I. of 0.1 or less was obtained. When deashed all the polymers could be compression moulded at 280° C. and quenched in ice water to give plaques of good transparency; in this case all polymers gave a light transmission (as measured by A.S.T.M. Test 1746–62T) of at least 85%.

Comparative Examples K–Q

Propylene polymerization.—In a vacuum purged, nitrogen-filled one litre polymerisation vessel was placed 500 mls. of hydrocarbon diluent and 5 millimoles of diethyl aluminum chloride. The flask was heated to 60° C. and evacuated. Propylene was then introduced to saturate the diluent and give a pressure of one atmosphere. 2.5 millimoles of catalyst were then introduced. The pressure was maintained at one atmosphere by a continued supply of propylene, the rate of consumption of the supply being a measure of polymerisation rate.

The results are given in Table 4.

TABLE 4

| Comparative Example | Catalyst | Polymerization rate (moles/mole TiCl$_3$ hour) At 50* | At 200* | Percent soluble polymer |
|---|---|---|---|---|
| K | 2 | 100 | 79 | 4.75 |
| L | 3 | 84 | 93 | 2.05 |
| M | 4 | 86 | 90 | 3.4 |
| N | 5 | 113 | 85 | 4.15 |
| O | A | 80 | 70 | 4.0 |
| P | B | 110 | 98 | 4.3 |
| Q | C | 120 | 110 | 4.0 |

*Rate is measured at conversions of 50 and 200 moles of propylene polymerised/mole TiCl$_3$.

Table 4 indicates that no significant improvement is obtained in the polymerization rate of propylene by replacing a sesqui-ethyl catalyst with a sesqui-isobutyl catalyst and, indeed, the sesqui-isobutyl catalyst used in Examples L and M are inferior to the sesqui-ethyl catalyst used in Examples P and Q.

EXAMPLE 14

Preparation of a n-hexylaluminum chloride mixture

A 2 litre flask was vacuum purged and filled with an atmosphere of nitrogen. 843 mls. of nitrogen-sparged hydrocarbon was introduced into the flask, followed by 272 grammes of tri-n-hexylaluminum, which contained 11% of other aluminum compounds, mainly tri-isobutylaluminum. The solution thereby obtained was stirred with 85 grammes of anhydrous aluminum chloride and heated to 70° C. for 4 hours. The solution was cooled and the yellow-brown supernatant liquid was decanted, under nitrogen, from unreacted solid. A sample of the solution was analyzed and was found to contain 1.46 grammes atoms of aluminum and 1.86 grammes atoms chloride per litre, this being equivalent to 1.06 moles of R$_2$AlCl and 0.40 mole of RAlCl$_2$ per litre, R representing a mixture of alkyl groups about 90% being n-hexyl, the remaining 10% being mainly isobutyl. This mixture is hereafter referred to as n-hexylaluminum chloride mixture. In this mixture the value of $n$ is 1.73.

EXAMPLE 15

Preparation of catalyst by reduction of titanium tetrachloride with n-hexylaluminum chloride mixture 27.5 mls. of titanium tetrachloride (0.225 mole) and 50 mls. of an inert hydrocarbon were placed in a stirred, vacuum purged, nitrogen-filled flask maintained at 0° C. To this solution was added, over a period of 7 hours, 213 mls. of n-hexylaluminum chloride mixture (equivalent to 0.225 mole $R_2AlCl$ and 0.085 mole $RAlCl_2$), the solution being maintained at 0° C. and stirred throughout. The mixture was then heated for 4 hours at 100° C. to give a catalyst mixture.

EXAMPLE 16

The catalyst of Example 15 was used, without washing to polymerize 4-methyl pentene-1.

200 mls. of 4-methyl pentene-1 and 500 mls. of inert hydrocarbon were placed in a vacuum purged, nitrogen-filled polymerization vessel, and the mixture maintained at 60° C. 4 millimoles of diethyl aluminum chloride and 2 millimoles of the catalyst of Exampe 15 were then added. After 1 hour polymerization was terminated. 52 grammes of insoluble polymer were obtained (39% conversion), the amount of soluble polymer being 1.15%.

Comparative Examples R and S

A repeat polymerization using the sesqui-ethyl catalyst of Example B gave a yield of 36%. However, the sesqui-ethyl catalyst had been washed to remove the soluble ethyl aluminum dichloride which is a polymerization inhibitor, whilst the n-hexylaluminum chloride catalyst had not been washed and thus contained the corresponding polymerization inhibitor, n-hexylaluminum dichloride.

A further comparative example was performed in which 1.2 millimoles of ethyl aluminum dichloride was added to the sesqui-ethyl catalyst, this being equivalent to the soluble dichloride present in the n-hexylaluminum chloride catalyst as determined by analysis. Using this catalyst with added ethyl aluminum dichloride to repeat Example 16, a conversion of 28.6% was obtained.

Comparative examples T and U

The procedure of comparative Examples K–Q was repeated using the sesqui-n-hexyl catalyst of Example 15. At a conversion of 50 moles of propylene/mole $TiCl_3$, the polymerization rate was 60 moles propylene/mole $TiCl_3$/hour, and at a conversion of 200 moles of propylene/mole $TiCl_3$, the polymerization rate was 47 moles propylene/mole $TiCl_3$/hour. Comparison of these rates with the rates set out in Table 4 for the sesqui-ethyl catalysts A, B and C shows the n-hexylaluminum chloride is inferior to the sesqui-ethyl catalyst in the polymerization of propylene.

In order to obtain a more realistic comparison between the unwashed n-hexylaluminum, chloride catalyst and the washed sesqui-ethyl catalyst, the polymerisation was repeated using catalyst B to which an appropriate amount of ethyl aluminum dichloride had been added. Using this catalyst, the polymerization rate for propylene is reduced to 75 moles propylene/mole $TiCl_3$/hour at a conversion of 50 moles propylene/mole $TiCl_3$ and to 60 moles propylene/mole $TiCl_3$/hour at a conversion of 200 moles propylene/mole $TiCl_3$.

The foregoing examples and comparative examples illustrate that sesqui-isobutyl and n-hexylaluminum chloride catalysts show higher activity in the polymerization of branched chain olefins such as 4-methyl pentene-1 than is shown with a sesqui-ethyl catalyst whilst in the polymerization of propylene, the former catalysts are somewhat less active than the sesqui-ethyl catalysts.

EXAMPLE 17

Preparation of n-propylaluminum sesquichloride 211 grammes of tri-n-propylaluminum were mixed with 180 grammes of dry aluminum chloride powder and the mixture was maintained under an inert atmospheric (nitrogen) at room temperature for three days. At the end of this time 1421 mls. of hydrocarbon diluent were added and the supernatant liquid was decanted from the unreacted aluminum chloride and some precipitated aluminum metal. After a further seven days, analysis of the solution indicated a concentration, per litre of solution, of 598 millimoles of di-n-propylaluminum chloride and 612 millimoles of n-propylaluminum dichloride. This mixture is referred to hereafter as n-propylaluminum sesquichloride. In this mixture the value of $n$ is 1.50.

EXAMPLE 18

Preparation of catalyst by reduction of titanium tetrachloride with n-propylaluminum sesquichloride 600 mls. of the n-propylaluminum sesquichloride solution of Example 17 were added over a period of 6 hours to a gently stirred solution of 44 mls. of titanium tetrachloride in 80 mls. of hydrocarbon diluent maintained at 0° C. Stirring was continued for a further 16 hours at 0° C. and the temperature was then raised to 100° C. for four hours. The solid precipitate was then washed, repeatedly with nitrogen-purged diluent until an aliquot of the supernatant liquid showed very little reaction for chloride with aqueous silver nitrate solution. The solid was then suspended in the hydrocarbon diluent as a 0.52 molar suspension and this catalyst suspension is hereinafter referred to as catalyst 18.

EXAMPLE 19

Preparation of isohexyl aluminum sesquichloride 190 grammes of tri-iso-hexyl aluminum were reacted with 90 grammes of dry aluminum chloride powder in an inert atmosphere by heating the mixture at about 80° C. for two hours. The mixture was allowed to cool and 606 mls. of nitrogen-purged hydrocarbon diluent were added. After standing for several days, the supernatant liquid was decanted from the solid (unreacted aluminum chloride and precipitated aluminum) and analysed. The solution had a composition, per litre, of 815 millimoles of dialkyl aluminum chloride and 479 millimoles of alkyl aluminum dichloride (alkyl is a mixture of 91.5% isohexyl (i.e. 2-methyl-pentyl), 7.4% isobutyl and 1% of ethyl, with traces of propyl). This mixture will be referred to as isohexyl-aluminum sesquichloride. In this mixture the value of $n$ is 1.63.

EXAMPLE 20

Preparation of catalyst by reduction of titanium tetrachloride with isohexyl aluminum sesquichloride 552 mls. of the isohexyl aluminum sesquichloride solution was added to 55 mls. of titanium tetrachloride in 100 mls. of hydrocarbon diluent at 0° C., the procedure otherwise being as set out in Example 18. The 0.52 molar catalyst suspension thus obtained will be referred to as catalyst 20.

Comparative Example V

Preparation of di-n-decyl aluminum chloride and a catalyst therefrom.—250 grammes of tri-n-decyl aluminum were reacted with 60 grammes of dry aluminum chloride powder in an inert atmosphere by heating to about 80° C. for one hour. The mixture was left at room temperature for three days and a large quantity of aluminum metal was deposited. 274 mls. of nitrogen-purged diluent were added and the mixture was filtered under nitrogen. The liquid was analysed and the solution was found to contain 1497 millimoles of didecyl aluminum chloride. No decyl aluminum dichloride was found and it was thought that this compound was unstable.

A catalyst (hereinafter referred to as catalyst V) was prepared as set out in Examples 18 using 200 mls. of di-n-decyl aluminum chloride solution and 36.5 mls. of titanium tetrachloride dissolved in 66.5 mls. of hydrocarbon diluent.

EXAMPLES 21 AND 22

In Example 21, the procedure of Examples 6 to 10 was repeated using catalyst 18.

In Example 22, the catalyst used was catalyst 20 and in this case polymerization was terminated after one hour (using only the initial charge of 120 mls. of 4-methyl pentene-1) since this catalyst produced thicker polymer slurries than the other catalysts.

The results obtained are set out in Table 5, which includes for comparative purposes results obtained with catalysts B and V.

TABLE 5

| Example or Comparative Example | Catalyst | Activator | Polymerization time (hours) | Polymer Percent yield | Polymer Percent soluble |
|---|---|---|---|---|---|
| 21 | 18 | Et$_2$AlCl | 2 | 69 | 1.0 |
| E | B | Et$_2$AlCl | 2 | 51 | 1.3 |
| 22 | 20 | Et$_2$AlCl | 1 | 57½ | 0.6 |
| WW | B | Et$_2$AlCl | 1 | 50½ | 0.7 |
| X | V | Et$_2$AlCl | 2 | 6 | 6 |

It will be observed that under the same polymerization conditions the catalysts 18 and 20 are more active than the corresponding ethyl aluminum sesquichloride reduced catalyst B, and that the activity of the didecyl aluminum chloride reduced catalyst V is very low.

Comparative Examples AA to CC

The procedure set out in Comparative Examples K to Q for the polymerization of propylene was repeated using catalyst 18, 20 and V. The results are set out in Table 6, which also includes, for the purposes of comparison, the results obtained with catalyst B and set out previously as Comparative Example P in Table 4.

TABLE 6

| Comparative Example | Catalyst | Polymerization rate (moles/mole TiCl$_3$ hour) at 50 | at 200 | Percent soluble polymer |
|---|---|---|---|---|
| AA | 18 | 105 | 96 | 3.45 |
| BB | 20 | 70 | 35 | 5.6 |
| CC | V | 10 | | |
| P | B | 110 | 98 | 4.3 |

The results show that catalysts 18 and 20 are no more effective for the polymerization of propylene than the ethyl aluminum sesquichloride reduced catalyst B, whilst the catalyst V shows low activity for both 4-methyl pentene-1 and propylene polymerization.

EXAMPLE 23

A 1.75 molar solution of isobutyl aluminum dichloride and a 1.27 molar solution of tri-isobutyl aluminum were mixed together and a further quantity of hydrocarbon diluent was added to give a solution containing 712 millimoles/litres of di-isobutyl aluminum chloride and 782 millimoles/litres of isobutyl aluminum dichloride. This solution was then used to reduce titanium tetrachloride using the technique as set out in Example 2–4 using the sesqui-isobutyl aluminum chloride solution in the amount of 0.9 mole of di-isobutyl aluminum chloride per mole of titanium tetrachloride. The catalyst thereby obtained will hereafter be referred to as catalyst 23. In this mixture the value of $n$ is 1.47.

EXAMPLE 24

Polymerization of 3-methyl butene-1

Catalyst 23 was used for the polymerization of 3-methyl butene-1.

Into a vacuum-purged, nitrogen-filled 300 mls. stirred reaction vessel were introduced 250 mls. of hydrocarbon diluent, 40 millimoles of diethyl aluminum chloride and 20 millimoles of catalyst 23. After the mixture had been stirred for 15 minutes at 60° C., 50 mls. of 3-methyl butene-1 were added over a period of one minute. The mixture was heated under reflux using a solid carbon dioxide reflux trap to prevent losses of 3-methyl butene-1. After two hours the reaction was terminated by the addition of 20 mls. of isopropanol. The polymer was washed several times with 100 mls. of methanol each time and the polymer was dried and weighed. On testing the solubility of the polymer it was found that very little was soluble showing the polymer to be substantially isotactic poly(3-methyl butene-1). In Table 7 are set out the yields (in grammes) of polymer obtained using catalyst 23 and the yield obtained under the same polymerization conditions using a sesquiethyl aluminum chloride reduced catalyst similar to catalyst B.

TABLE 7

| Catalyst: | Yield (gms.) |
|---|---|
| 23 | 8.25 |
| B | 3.8 |

It will be observed that the results with 3-methyl butene-1 are similar to those obtained with 4-methyl pentene-1 in that an improved yield is obtained using the sequi-isobutyl aluminum chloride reduced catalyst.

In all the foregoing examples the diluent used was that described in Example 1.

I claim:
1. An olefine polymerization process wherein a branched chain olefine selected from the group consisting of 3-methyl butene-1; 3-methyl pentene-1; 3-ethyl pentene-1; 3-methyl hexene-1; 4-methyl pentene-1; 4,4-dimethyl pentene-1; 4-methyl hexene-1; 5-methyl hexene-1; 5,5-dimethyl hexene-1; 3,5-dimethyl hexene-1; 3,5,5-trimethyl hexene-1 and vinyl cyclohexane, is polymerized in the presence of polymerization catalyst comprising (a) a dialkyl aluminum halide activator and (b) the insoluble reaction product of titanium tetrachloride and an organoaluminum compound of the formula

wherein
$n$ is from about 1.4 to 1.73,
R is an n-propyl; iso-butyl; n-hexyl or isohexyl group; and
X is chloride or bromide, wherein said insoluble reaction product is prepared at a temperature in the range −20° to +20° C. by the slow addition of a solution of the organo-aluminum compound in a hydrocarbon diluent to a solution of the titanium tetrachloride in the same hydrocarbon diluent wherein the molar proportion of titanium tetrachloride to organo-aluminum compound expressed as the ratio of gramme moles of titanium tetrachloride to ($n$−1) gramme atoms of aluminum present in the organo-aluminum compound R$_n$AlX$_{(3-n)}$ is in the range from 1 to 2 up to 1 to 0.5 and the dialkyl aluminum halide and the insoluble reaction product are used in a molar ratio in the range 1 to 1 up to 5 to 1.

2. The process of claim 1 wherein the branched chain olefine is 4-methyl pentene-1 or 3-methyl butene-1.

3. The process of claim 2 wherein $n$ is from about 1.4 to 1.6.

4. The process of claim 3 wherein the branched chain olefine is 4-methyl pentene-1, X is chlorine and R is isobutyl.

5. The process of claim 4 wherein the 4-methyl pentene-1 is copolymerized with up to 2 percent by volume with a linear 1-olefin containing 4 to 18 carbon atoms.

References Cited

UNITED STATES PATENTS

| | | | |
|---|---|---|---|
| 3,108,973 | 10/1963 | Vandenberg | 252—429 |
| 3,332,920 | 7/1967 | Clark et al. | 260—88.2 |

FOREIGN PATENTS 863,416  3/1961  Great Britain.

JOSEPH L. SCHOFER, Primary Examiner

E. J. SMITH, Assistant Examiner

U.S. Cl. X.R.

252—429 C; 260—93.1, 93.7, 94.9 E